E. A. DEEDS.
AUTOMOBILE CONSTRUCTION.
APPLICATION FILED FEB. 1, 1911.
1,152,712.
Patented Sept. 7, 1915.
3 SHEETS—SHEET 1.
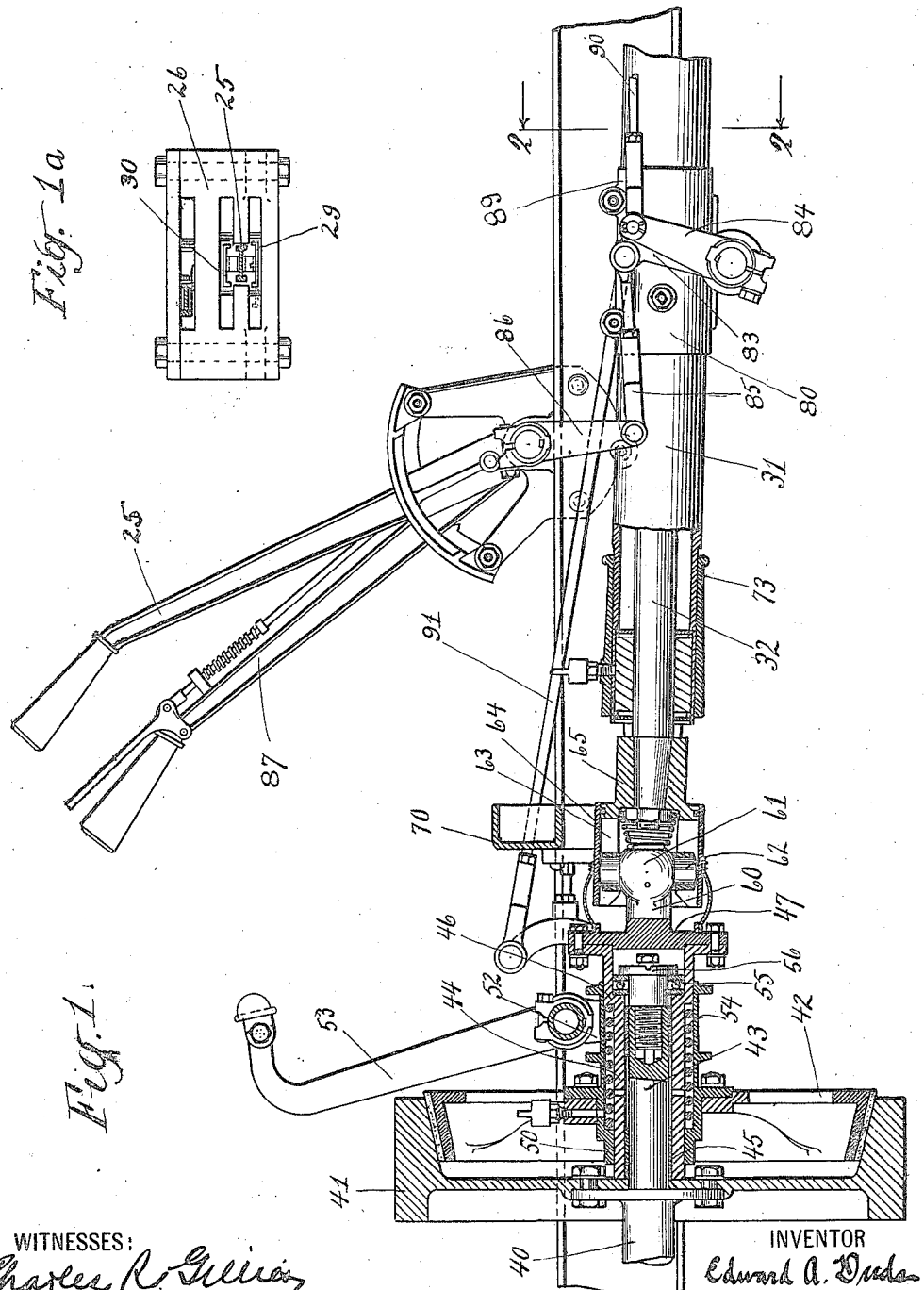
WITNESSES:
INVENTOR
Edward A. Deeds
BY
ATTORNEYS.

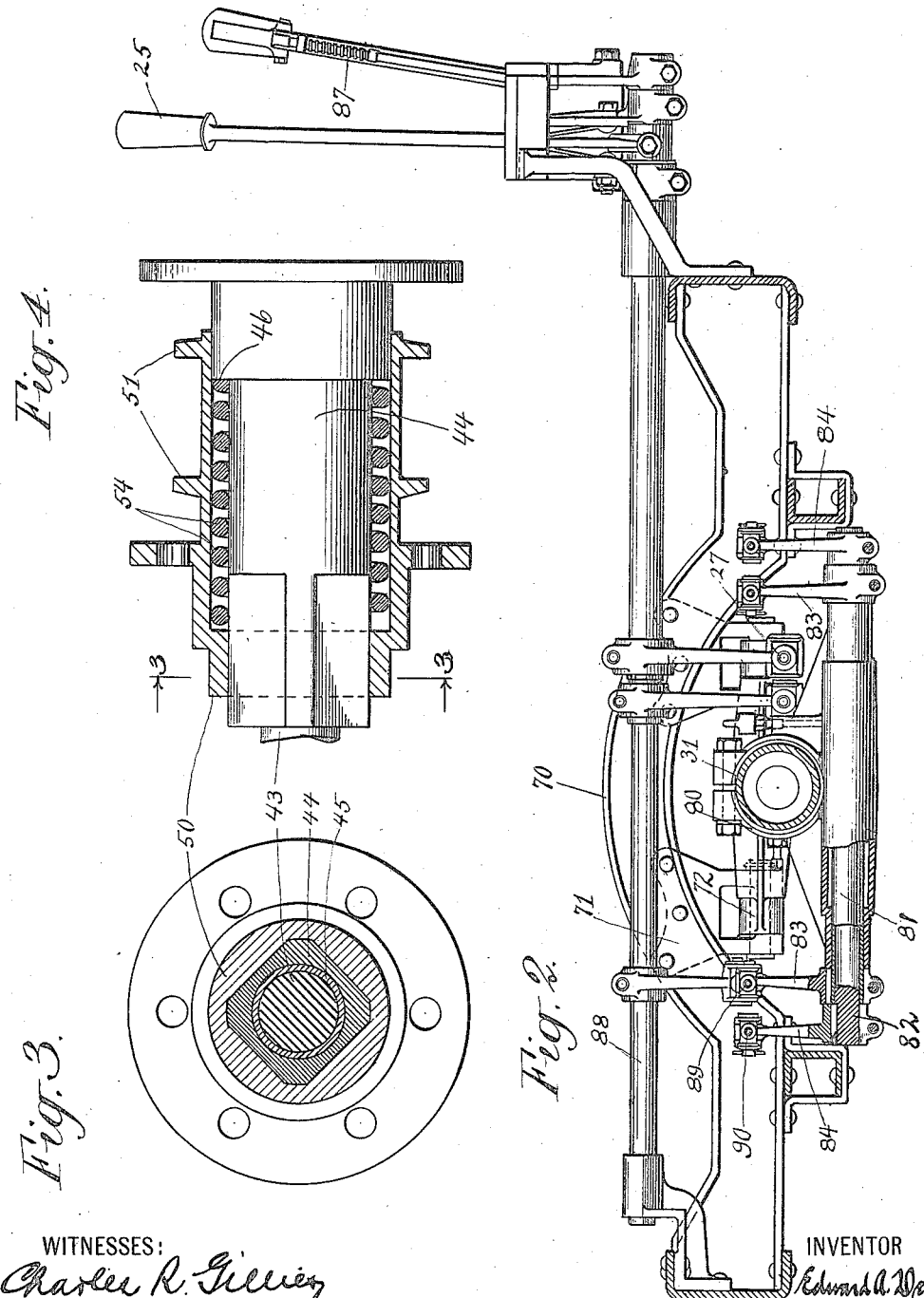

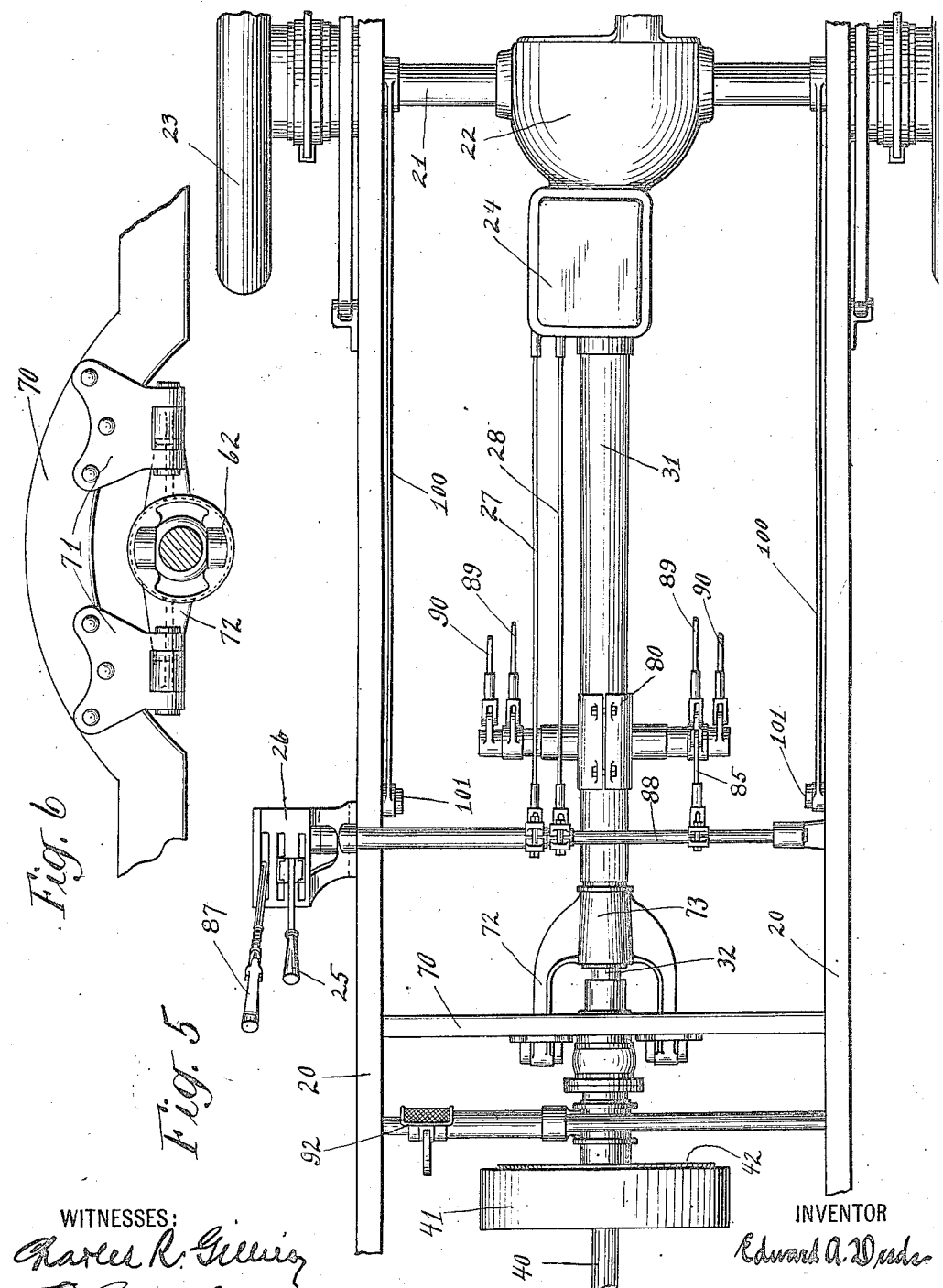

UNITED STATES PATENT OFFICE.

EDWARD A. DEEDS, OF DAYTON, OHIO.

AUTOMOBILE CONSTRUCTION.

1,152,712.   Specification of Letters Patent.   Patented Sept. 7, 1915.

Application filed February 1, 1911. Serial No. 606,010.

*To all whom it may concern:*

Be it known that I, EDWARD A. DEEDS, residing at Dayton, Montgomery county, Ohio, have invented certain new and useful Improvements in Automobile Constructions, of which the following is a full, clear, and exact description.

This invention relates to improvements in automobile constructions, more particularly as relating to the construction of the clutch with its driving connections, also certain other improved constructions with reference to the driving control mechanism.

It is among the objects of these improvements to provide such a form of under-body construction and driving connection that will simplify the mechanical structure of the driving devices between the clutch and the rear axle and at the same time make a more secure, economical and advantageous construction. In accomplishing these objects, the clutch mechanism with its connecting parts is so arranged to permit the use of only a single universal joint intervening between the clutch and the transmission, this transmission being located upon the rear axle. By having the transmission located on the rear axle, but with a single universal joint located near the clutch, this makes possible a long propeller shaft and a straight line drive and multiple torque is not exerted on the universal joint.

In connection with this construction, the brake rods are supported on the torque tube and on the same center as the radius rods so that the effectiveness of the brakes is not disturbed by uneven road conditions.

With these and incidental objects in view, and with the further advantageous results such as will be apparent from the ensuing description, the invention resides in certain novel combination of parts, a preferred form of embodiment of which is shown in the accompanying drawings and which will now be more specifically described.

In such drawings,—Figure 1 is a partly sectionalized view taken longitudinally of the body of the car, showing the clutch mechanism and the connections with the other part of the driving mechanism; Fig. 1ª is a detail top plan view of the usual H-slot plate through which the control lever and the emergency brake project; Fig. 2 is a transverse section approximately on the line 2—2 of Fig. 1; Fig. 3 is a detail sectional view of part of the clutch on the line 3—3 of Fig. 4; Fig. 4 is a partly sectionalized view of part of the clutch; Fig. 5 is a top plan view of the under-body construction of the automobile, showing the general location of the parts comprising the flywheel, the clutch, the driving mechanism, the transmission, the brake rods, and other parts commonly used in automobile construction; and Fig. 6 is a detail view of part of the supporting cross frame which carries the support for the end of the torque tube.

Referring to Fig. 5, the under-body construction of the car is shown, in which the side frames 20 extend longitudinally of the car, at the rear end of which is located the axle 21 having a casing 22 inclosing the usual differential mechanism for driving the wheels 23. Adjacent to this casing 22 is a casing 24 which incloses the usual transmission mechanism which may be of the well known selective type, with three speeds forward and one reverse. This transmission is controlled in a well known manner by a transmission control lever 25 which projects through the usual form of H-slot plate 26.

Upon the movement of the control lever 25 into the different sides of this slot, the three speeds forward and the reverse may be selectively operated, this being a construction well known in the art. The connection between the control lever 25 and the transmission box is made by transmission rods 27 and 28 which are connected with the dogs 29 and 30 shown in Fig. 1ª. It will thus be seen from Fig. 1ª that the control lever 25, which in neutral position occupies the center portion of the H-slot, may be shifted laterally to engage either one of the dogs 29 or 30, and thereby connect the control lever with either one of the transmission rods 27 and 28.

In some cases it has heretofore been customary to mount transmission boxes upon the rear axle, but to use two universal joints, one adjacent to the transmission box toward the rear end of the car, and the other adjacent to the clutch near the forward end of the car. In the present invention one of these universal joints is dispensed with so that only a single universal joint is used, the transmission box is still kept on the rear axle, and by means of this improved construction to be described, a long and straight line drive is secured and it is still possible to use the selective type of transmission even though the transmission box is located upon the rear axle.

It will be seen from Fig. 5 that the torque tube 31 extends forward from the rear axle and transmission box. This torque tube, as presently will be explained, is pivoted at its forward end on approximately the fixed center of the universal joint, and the torque tube incloses the propeller drive shaft 32 (see also Fig. 1) through which the driving power is transmitted from the clutch through the universal joint, to the rear axle differential mechanism.

The main engine shaft 40 (see Figs. 1 and 5) is connected to and drives the fly-wheel 41. Into this fly-wheel fits the clutch-wheel 42 of the well known cone type. The rearward end 43 of the driving shaft 40 projects through the fly-wheel and through the center portion of the clutch mechanism as is shown in Fig. 1. Surrounding this reduced end 43 of the driving shaft is a revoluble collar 44, suitably separated from the shaft 43 by bushing 45. This collar extends rearward and is formed with a bent or right-angle portion 46 which serves as a shoulder for the purposes later to be explained. The extreme rearward end of this collar 44 is bolted to a revoluble head 47 which is connected with the universal which will presently be explained.

The forward end of the collar 44 is formed square instead of round, as clearly shown in Figs. 3 and 4, the purpose of this being to give a driving grip on this collar as will presently be seen. Surrounding this collar 44 is a sleeve 50, the shape of which is clearly seen in Fig. 4 as well as Fig. 1. This sleeve is fast to the clutch-wheel 42 so that as the clutch-wheel slips forward and backward into and out of engagement with the fly-wheel, this sleeve 50 slides in the same manner forward and backward. Annular projections 51 are formed on this sleeve, into which an arm 52 projects extending downward from the clutch pedal 53 in a well known manner. Thus by operation of the foot pedal 53, the arm 52 operates upon the sleeve 50 to throw the clutch-wheel into and out of engagement with the fly-wheel.

It will be seen that the forward end of the sleeve 50 is always in engagement with the square portion of the collar 44 and always remains in engagement therewith during its shifting movement. Therefore when the clutch is in, the rotation of the fly-wheel rotates the clutch-wheel and through the sleeve 50 rotates the interior collar 44, thereby rotating the head 47.

A spring 54 is located between the sleeve 50 and the collar 44, bearing at one end against the right-angle portion or shoulder 46 of the collar 44, and at its forward end against a similar shoulder formed on the inside of the sleeve 50. This spring tends normally to keep the clutch-wheel in engagement with the fly-wheel, the collar 44 having no longitudinal movement. This same shoulder 46 of the collar 44 serves as a seat for the roller bearing 55 against which rests the screw-head 56 of the end of the engine shaft 43.

The aforesaid revoluble head 47, which is connected to the revoluble collar 44, has projecting rearward from it the short shaft 60 carrying the universal ball 61. Through this ball extends the pin 62 which projects on opposite sides of the ball, into slots 63 formed in the universal head 64. This universal head 64 is made fast at 65 to the aforesaid propeller shaft 32 which extends backward through the torque tube 31 to the rear axle. It thus results that when the clutch is in, the turning of the collar 44 and the head 47, operates through this universal connection to rotate the propeller shaft 32.

Now although the clutch-wheel 42 and the sleeve 50 move backward and forward, or longitudinally, in the shifting of the clutch, yet the revoluble collar 44 has no longitudinal movement and likewise the head 47 and universal ball 61 stand practically as a fixed point of propulsion of the propeller shaft 32.

When the rear axle moves up and down, such as in going over uneven roads, and thereby varies in its actual distance from the under framework of the car, of course the propeller shaft 31 will move up and down with it but it will swing upon the pivotal point of the universal ball 61. The aforesaid slots 63 in the universal head 64 of course permit this slight angular change in the positions of the propeller shaft 32. Now at the same time that the propeller shaft is having this up and down movement with the corresponding up and down movement of the rear axle, of course the surrounding torque tube 31 has a similar movement. I have therefore so constructed this device that the torque tube has a pivotal swinging point at approximately this same line of center as the universal ball 61, so that the torque tube and propeller shaft swing upon the same center, thus avoiding the effect of any multiple torque upon the universal joint. This method of swinging the torque tube is shown in Figs. 5 and 6. The cross frame 70 extends transversely between the side frames 20 and carries two hangers 71 in which are pivoted the forked ends 72 of a yoke head or collar 73 which surrounds the forward end of the torque tube 31. Thus the forward end of the tube 31 is telescoped into this yoke head so as to permit slight longitudinal movement of the torque tube such as of course would be necessary with the up and down movement of the rear axle relatively to the framework of the machine. This telescoping or construction is clearly shown in Fig. 1.

It is well known that in automobiles generally, it has been customary to have two sets of brakes, one set being applied by the foot pedal situated adjacent to the clutch pedal, and the other set being applied by the emergency lever and known as the emergency brake. The various brake pedals and levers are connected by the brake-rods to the brakes, and difficulty has sometimes been experienced in that the effectiveness of the brakes is disturbed on account of uneven road conditions. I have so arranged my construction that this difficulty is minimized and the unevenness of the road has practically no effect upon the brake-rods.

Mounted upon the torque tube 31 (see Figs. 1, 2 and 5) is a supporting collar 80 which is intended to serve as a support for the brake rods. Extending laterally from the under-side of this collar 80 are the telescoping tubes 81 and 82 from which project upward the levers 83 and 84. The inside pair of levers 83 are for the emergency brakes, and are connected at their forward ends by the pitman 85 to the crank-arm 86 connected to the emergency brake lever 87. This crank arm 86 is connected with the emergency brake lever 87 through the cross shaft 88 upon which is mounted sleeves and connections that connect up the transmission rods 27 and 28 with their respective dogs 29 and 30 as previously explained. The emergency brake-rods 89 are partly shown in Fig. 5, also in Fig. 1 extending backward from the levers 83. The aforesaid outside levers 84, extending upward from the inner tube 82, are connected by the brake-rods 90 to the brake-bands which are usually operated by the foot pedal. The connecting link 91 is shown in Fig. 1 extending forward from one of the levers 84, and this link 91 is connected in the usual manner to the foot pedal such as is shown at 92 in Fig. 5, this foot pedal usually being situated adjacent to the clutch pedal in a well known manner and operating when pressed forward, to pull the link 91 forward and thus set the foot brakes through the medium of the brake-rods 90. Thus it will be seen that this supporting collar 80 forms a support for the brake-rods so that the brake-rods (which as is well known, connect with the brakes on the rear axle) move up and down with the torque tube as one system.

Now the point about which the rear axle really pivots in its up and down movement relatively to the framework, is really determined by the push-rods or radius-rods, as they are called. These radius-rods are shown at 100 in Fig. 5, extending from the rear axle 21 to the pivotal points 101 where they are pivoted to the side frames 20 of the car. Thus it is evident that as the rear axle swings up and down, it will swing about these pivotal points 101 as a center. Thus it will be seen that the brake-rods are supported practically upon this same center line. Likewise the transmission rods have a pivotal support, with reference to the framework, practically upon this same pivotal line as determined by the pivotal points of the radius-rods. Therefore these brake-rods and the transmission rods all move up and down with the torque tube as if practically pivoted or centered upon this one axis, namely, the axis of the pivotal points 101 of the radius-rods. The result is that there is practically no relative longitudinal movements between these rods and the framework of the car due to any such up and down movement of the rear axle. Consequently regardless of unevenness of the road and the travel of the car over bumps, or springing of the car frame up and down relatively to the rear axle, there is no appreciable effect upon these brake-rods and hence no change in the effectiveness of the brakes due to such conditions. Moreover, since the same thing is true of the transmission rods 27 and 28 there is no corresponding movement of the aforesaid dogs 29 and 30 which project up into the H-slot plate and are intended to be engaged by the transmission control lever 25 in a well known manner. If there were any such oscillatory movement of these dogs due to the slight longitudinal movements of the transmission rods 27 and 28, with uneven road conditions, then the operator might not be able to engage the control lever with the desired dog because it would not be in its proper place directly opposite the center portion of the H-slot, nor might he sometimes be able to disengage the lever owing to similar conditions. The present construction remedies these difficulties and makes it possible to retain this selective type of transmission and at the same time have the transmission located upon the rear axle with its attendant advantages.

While the form of mechanism herein shown constitutes a prefererd form of embodiment of my invention, it is to be understood that it is capable of embodiment in various other forms and that these devices are applicable not only to automobiles but to other kinds of vehicles where conditions of this sort are met with, and these various other forms are to be understood as of coming within the scope of the claims which follow.

What is claimed is as follows:

1. In an automobile construction, the combination with an engine driving mechanism, a propeller shaft, and a clutch member for connecting the said engine driving mechanism; of a universal joint connecting said clutch member with said propeller shaft; a torque tube mounted to swing substantially upon the same pivotal center with said universal joint; and a forward bearing for said universal joint associated with said clutch member for preventing forward longitudinal displacement of the said universal joint.

2. In an automobile construction, the combination with an engine driving shaft, and a clutch member adapted to be connected therewith; of a shifting sleeve connected with said clutch member; a revoluble collar located within said shifting sleeve and formed to be rotated thereby, said collar being mounted to maintain a relatively fixed longitudinal position; a propeller shaft; and a universal connecting said revoluble collar and said propeller shaft, one element of said universal being connected to said revoluble collar and thereby having a relatively fixed longitudinal position independent of longitudinal shifting of said clutch member.

3. In an automobile construction, the combination with an engine driving shaft, and a clutch member adapted to be connected therewith; of a shifting sleeve connected with said clutch member; a collar located within said sleeve and formed to be engaged with and rotated by the latter; a propeller shaft; and a universal connecting said collar and said propeller shaft.

4. In an automobile construction, the combination with an engine driving shaft, and clutch device comprising a fly-wheel mounted upon said engine shaft and a clutch wheel coöperating with said fly-wheel and journaled upon an extension of said driving shaft, said clutch wheel having a longitudinal movement with respect to said extension; of a propeller shaft; a universal located between the propeller shaft and said clutch wheel for transmitting the rotary movement of the clutch wheel to the propeller shaft; and a spring intervening between said clutch wheel and said universal to thrust backward upon the universal and assist in preventing longitudinal forward displacement thereof.

5. In an automobile construction, the combination with an engine driving shaft, and a clutch device comprising a primary clutch member mounted upon the engine shaft and a secondary clutch member coöperating with the primary clutch member; of a propeller shaft; a collar connected with and rotating with said propeller shaft; and a sleeve connected with said secondary clutch member and comprising means for connecting the sleeve with said collar to permit longitudinal movement of the sleeve with reference to the collar and to impart rotary movement to the collar from said sleeve and its connected secondary clutch member.

6. In an automobile construction, the combination with an engine driving shaft, and a clutch member adapted to be connected therewith; of a shifting sleeve connected with said clutch member; a revoluble collar located within said shifting sleeve and formed to be rotated thereby; a propeller shaft connected with said collar; and resilient means located between said sleeve and collar abutting against opposite ends of the sleeve and collar for causing engagement of said clutch member with said engine driving shaft.

7. In an automobile construction, the combination with an engine driving shaft including an extension thereof, and a clutch member adapted to be connected with said shaft; of a shifting sleeve connected with said clutch member; a revoluble collar located within said shifting sleeve and formed to be rotated thereby; a propeller shaft connected with said collar; resilient means located between said sleeve and collar abutting against opposite ends of the sleeve and collar for causing engagement of said clutch member with said engine driving shaft; and a thrust bearing connected with an extension of the main driving shaft and abutting against said collar to prevent rearward longitudinal displacement of the collar and its connected parts.

8. In an automobile construction, the combination with an engine driving shaft including an extension thereof, and a clutch member adapted to be connected with said shaft; of a shifting sleeve connected with said clutch member; a revoluble collar located within said shifting sleeve and formed to be rotated thereby; a propeller shaft connected with said collar; resilient means located between said sleeve and collar abutting against opposite ends of the sleeve and collar for causing engagement of said clutch member with said engine driving shaft; and a thrust bearing connected with an extension of the main driving shaft and abutting against said collar to prevent rearward longitudinal displacement of the collar and its connected parts, said collar also extending forward to abut against a portion of the engine driving mechanism whereby to limit any forward longitudinal movement of the collar.

In testimony whereof I affix my signature in the presence of two subscribing witnesses.

EDWARD A. DEEDS.

Witnesses:
  H. N. Riehle,
  E. J. Graef.